United States Patent [19]

Hogan et al.

[11] 4,053,436

[45] Oct. 11, 1977

[54] SPRAY DRIED TITANIUM-CONTAINING CATALYST FOR STRESS CRACK RESISTANT POLYMER

[75] Inventors: John P. Hogan; Donald D. Norwood, both of Bartlesville, Okla.

[73] Assignee: Phillips Petroleum Company, Bartlesville, Okla.

[21] Appl. No.: 607,977

[22] Filed: Aug. 26, 1975

[51] Int. Cl.² .................... B01J 37/02; B01J 29/00
[52] U.S. Cl. .................................. 252/452; 252/458
[58] Field of Search .................. 252/451, 452, 458

[56] References Cited

U.S. PATENT DOCUMENTS

| 3,523,912 | 11/1970 | Jaffe | 252/452 X |
| 3,887,494 | 6/1975 | Dietz | 252/452 |

Primary Examiner—Carl F. Dees

[57] ABSTRACT

A chromium-containing catalyst utilizing spray dried silica gel containing titanium is used to produce olefin polymers exhibiting an outstanding resistance to environmental stress cracking.

7 Claims, 4 Drawing Figures

SPRAY DRIED TITANIUM-CONTAINING CATALYST FOR STRESS CRACK RESISTANT POLYMER

BACKGROUND OF THE INVENTION

This invention relates to titanium-containing catalysts for producing olefin polymers.

It has long been known to produce olefin polymers utilizing a supported chromium catalyst as disclosed in Hogan et al U.S. Pat. No. 2,825,721. More recently it has been discovered that certain advantages can flow from the presence of a titanium compound in the catalyst as shown, for instance, by Nasser, Jr. U.S. Pat. No. 3,798,202.

It is well known that polymer properties can be influenced by variations in the process conditions and by variations in catalyst composition. For instance operation at a lower reactor temperature tends to give lower melt index (higher molecular weight) polymer and the reaction rate may be slowed down. As shown by said Nasser, Jr. patent, it is known that the melt index can be increased by the incorporation of a titanium compound. As a general proposition lower melt index, broader molecular weight distribution (high HLMI/Mi ratio) polymers of similar densities tend to have better resistance to environmental stress cracking. Also the incorporation of comonomer to lower the density also can tend to increase environmental stress crack resistance with polymers having similar melt indexes. However, factors which bring about improvement in stress crack resistance generally result in a compromise in other properties. For instance lowering the melt index will result in a product which is less processable and which has reduced stiffness. Thus frequently a sacrifice must be made in one property if an improvement is to be made in another.

SUMMARY OF THE INVENTION

It is an object of this invention to produce olefin polymers having a disproportionately high environmental stress crack resistance as compared with polymer produced at the same temperature with prior art catalysts;

it is a further object of this invention to allow polymerization at a high temperature without the expected sacrifice in melt index and stress crack resistance;

and it is still a further object of this invention to provide a polymer having surprisingly greater environmental stress crack resistance than would be predicted from the other physical properties.

In accordance with this invention, olefin monomer is polymerized utilizing a chromium-containing catalyst formed by producing a cogel of a titanium compound and silica and thereafter spray drying the cogel.

BRIEF DESCRIPTION OF THE DRAWINGS

In the drawings, forming a part hereof.

DESCRIPTION OF THE PREFERRED EMBODIMENTS

Figure 1:
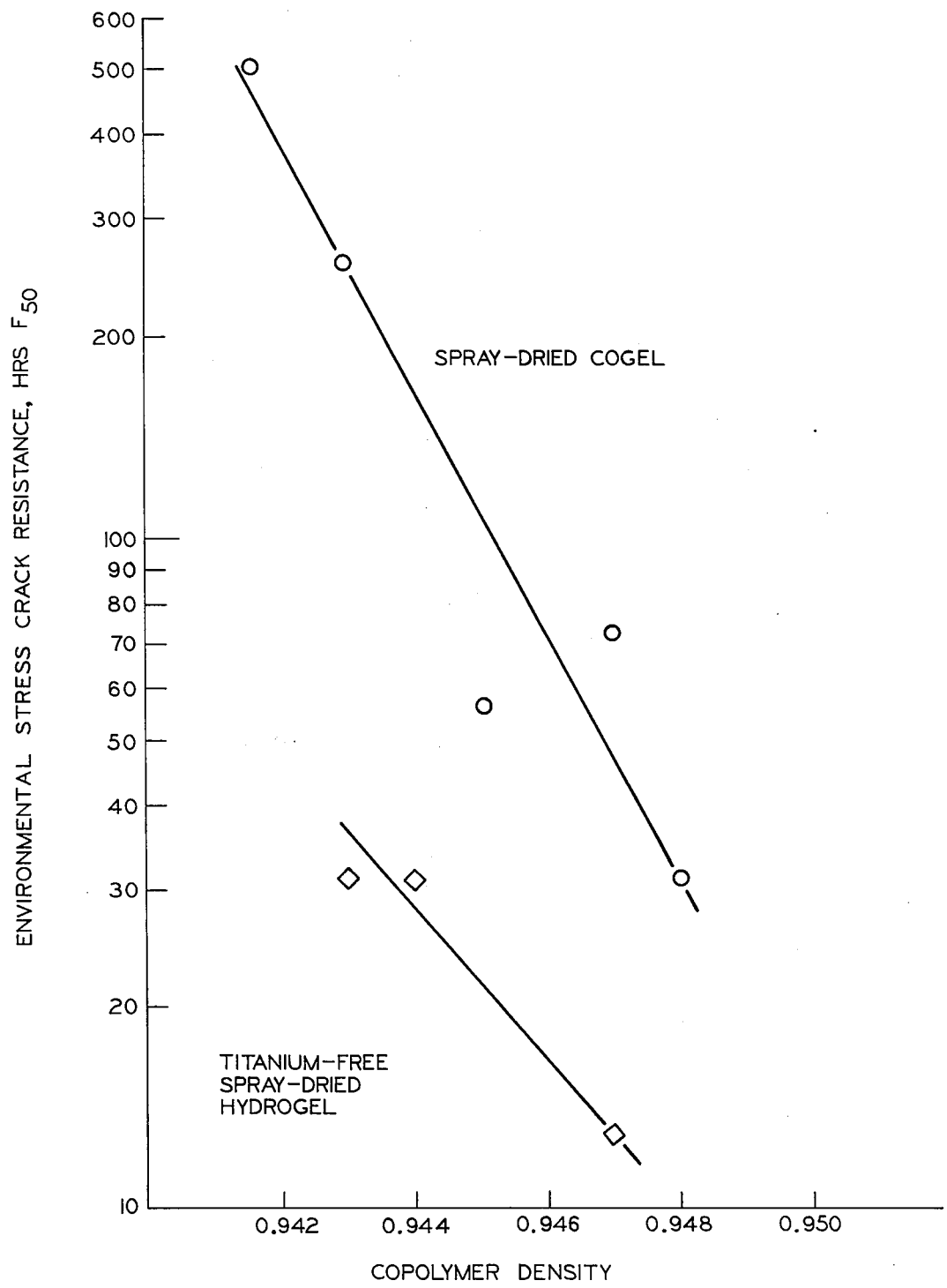
FIG. 1 is a plot of stress crack resistance vs. density for polymer produced using spray dried titanium cogel of the invention and for comparison, spray dried titanium-free silica.

The base for the catalysts of this invention must be a cogel of silica and a titanium compound. Such a cogel hydrogel can be produced by contacting an alkali metal silicate such as sodium silicate with an acidic material such as an acid, carbon dioxide, or an acidic salt. The preferred procedure is to utilize sodium silicate and an acid such as sulfuric acid, hydrochloric acid, or acetic acid with sulfuric acid being most preferred. The titanium compound must be coprecipitated with the silica and thus most conveniently the titanium compound will be dissolved in the acid or alkali metal silicate solution. Suitable titanium compounds include titanium tetrachloride, titanium sulfate, and other titanium compounds soluble in the acid and convertible to titanium oxide on calcination. In instances where carbon dioxide is used, the titanium, of course, must be incorporated into the alkali metal silicate itself. Also with acidic salts it is preferred to incorporate the titanium compound in the alkali metal silicate and in such instances the preferred titanium compounds are water soluble materials which do not precipitate the silicate, i.e., are nonreactive with the silicate. Exemplary of such materials are those convertible to titanium oxide on calcination such as $K_2TiO(C_2O_4)_2 \cdot H_2O$ (titanium potassium oxalate); $(NH_4)_2TiO(C_2O_4)_2 \cdot H_2O$, and $Ti_2(C_2O_4)_3 \cdot 1H_2O$.

The titanium compound is preferably present in an amount within the range of 1 to 10, preferably 1.5 to 7.5 weight percent calculated as titanium based on the weight of $SiO_2$. The hydrogels produced by this invention are preferably aged by at least 1 hour and up to 24 hours or more at a temperature of about 65° F to about 200° F (18°-93° C), washed with dilute ammonium nitrate solutions (about 0.5-2 wt. % salt) and finally with $H_2O$ until the sodium ion content is reduced to about 0.1 wt. % or lower.

The catalyst of this invention must contain a chromium compound. This can be incorporated in any of several separate ways. First a tergel can be prepared wherein the chromium compound, as well as the titanium compound, is dissolved in the acidic material or the silicate and thus coprecipitated with the silica. A suitable chromium-containing compound for use in this embodiment is chromic sulfate.

A second method of incorporating the chromium compound is to introduce an aqueous solution of water soluble chromium compounds such as chromium acetate into the hydrogel prior to drying. Chromium trioxide can also be used but it is less preferred because it is too soluble and tends to drain off with the excess water. Other chromium compounds such as chromium nitrate, which are convertible to chromium oxide on calcination, can also be used.

In a third embodiment, a hydrocarbon solution of a chromium compound convertible to chromium oxide can be used to impregnate the support after it is dried (i.e., the xerogel). Exemplary of such materials are tertbutyl chromate, chromium acetylacetonate and the like. Suitable solvents include pentane, hexane, benzene and the like. Surprisingly, an aqueous solution of a chromium compound can also be used after drying. Finally a chromium compound can simply be physically mixed with the support.

Chromium is preferably present in an amount of 0.1 to 20 weight percent, preferably 0.5 to 4 weight percent chromium calculated as $CrO_3$ based on the total weight of catalyst (support plus chromium compound).

The cogel, containing chromium or not depending upon the point of addition of chromium as noted herein above, is then spray dried in a manner known in the art to produce a xerogel. For instance, a conventional spray drier can be used utilizing a rotating wheel wherein hot air is passed around the wheel and atomized gel is hit by the air and dried before it impinges upon walls of the drier. In a typical operation, an inlet temperature of 600°–900° F (316°–482° C) an outlet temperature of 250°–400° F (121°–204° C) are utilized. The resulting dried material (xerogel) is then calcined in a manner known in the art or in instances were chromium is not yet present, it is impregnated in a solution of chromium and then calcined.

Calcination can take place by heating in the presence of molecular oxygen at a temperature within the range of 700°–2000° F (371°–1093° C), preferably 900°–1700° F (482°–927° C) for about ½ hour to 50 hours, more preferably 2–10 hours. At least a substantial portion of the chromium in low valence stage is converted to the hexavalent form. Preferably this is carried out in a stream of fluidizing air which stream of fluidizing air is continued as the material is cooled.

The catalysts of this invention can be utilized in the polymerization of at least one mono 1-olefin containing 2–8 carbon atoms per molecule. The catalysts of this invention are of particular utility in the preparation of copolymers of ethylene and a mono 1-olefin having 3–8 carbon atoms per molecule.

Most preferably the catalysts of this invention are utilized for the production of the ethylene copolymers in a slurry process wherein the temperature is such that polymer produced is substantially insoluble in the diluent used. Typical temperatures are 150°–230° F (66°–110° C). Such processes are known in the art and are disclosed in Rohlfing U.S. Pat. No. 3,405,109, disclosure of which is hereby incorporated by reference.

EXAMPLE 1

A batch of cogel hydrogel was prepared by adding sodium silicate to sulfuric acid containing titanyl sulfate in an amount sufficient to give 2.5 weight percent titanium based on the weight of the final catalyst. The resulting hydrogel was aged for 5 hours at about 190° F (88° C) and then washed with 0.5 wt. % ammonium nitrate solution and finally with deionized water. The resulting hydrogel was divided into two portions. One was spray dried in a Nichols-Niro 4-foot spray dryer at 820° F (438° C) inlet and 270° F (132° C) outlet temperatures. An atomizer speed of 24,000 rpm and a feed slurry concentration of about 4 weight percent solids (probably much lower than optimum) was used.

A second portion was conventionally azeotrope dried with ethyl acetate at existing atmospheric pressure.

The first portion which had been spray dried was impregnated with an aqueous solution of chromium trioxide sufficient to give 2 wt. % chromium calculated as $CrO_3$. It was then dried. The resulting material was activated in a fluidized bed with air at 1500° F (816° C) to give the first catalyst of this example which is referred to herein below as "spray dried cogel".

A microspheroidal spray dried silica containing $CrO_3$ sufficient to give 2 wt. % Cr calculated as $CrO_3$ was prepared by adding sulfuric acid to a sodium silicate solution and ion exchanging to remove sodium ions and thereafter washing with water. The resulting hydrogel was impregnated with aqueous chromium and spray dried to give a titanium-free xerogel which was activated at 1500° F in the fluidized bed in a manner similar to the above described catalyst to give a second catalyst for comparison purposes referred to herein below as "titanium-free spray dried hydrogel".

The second portion of the cogel which had been azeotrope dried was impregnated with sufficient t-butyl chromate in pentane to give about 2 wt. % chromium calculated as $CrO_3$ in the final catalyst, and was activated at 1400° F (766° C) and then used in the following example under the designation "azeotrope dried cogel".

These catalysts were then used in the production of ethylene/hexene copolymers under reaction conditions such that the polymer formed was insoluble in the reaction medium, using a stirred 3-liter batch reactor. About 1.25 pounds of isobutane diluent was used, along with 0.03–0.04 gram of catalyst with an ethylene feed pressure of 500 psig (3.45 MPa gage). The designation MI refers to the melt index which is a measure of flow at 190° C as set out in ASTM D 1238-62T condition E. HLMI refers to a high load melt index which is a measure of flow at 190° C as set out in ASTM D 1238-62T condition F. The column labeled HLMI/MI is the ratio of flow at two different pressures, and is in general an indication of the breadth of the molecular weight distribution with the higher number indicating a higher molecular weight distribution which is generally associated with better resistance to stress cracking. The density was determined by ASTM D 1505-63T. The column labeled ESCR is a measure of the resistance to stress cracking under a detergent environment wherein the samples are put under a stress and the time for 50% of the samples to fail is determined. The test is determined by ASTM D 1693-70. The results are shown herein below in Table I.

TABLE I

| Run | Catalyst | % Hexene Comonomer | Reaction Temp., °F | (°C) | Run Time, Min. | Prod. lb/lb | MI | Density | HLMI/MI | ESCR $F_{50}$, Hrs. |
|---|---|---|---|---|---|---|---|---|---|---|
| 1 | Spray-Dried Cogel | 3.3 | 220 | (104) | 35 | 5300 | 0.33 | 0.9482 | 98 | 31 |
| 2 | " | 3.9 | 219 | (104) | 33 | 5700 | 0.32 | 0.9470 | 108 | 72 |
| 3 | " | 4.4 | 218 | (103) | 32 | 5200 | 0.32 | 0.9452 | 102 | 56 |
| 4 | " | 8.7 | 218 | (103) | 33 | 5000 | 0.43 | 0.9430 | 96 | 254 |
| 5 | " | 9.2 | 216 | (102) | 30 | 5400 | 0.41 | 0.9416 | 97 | 500 |
| 6 | Titanium-Free Spray Dried Hydrogel | 3.5 | 216 | (102) | 42 | 5200 | 0.36 | 0.9474 | 105 | 13 |
| 7 | " | 5.3 | 215 | (102) | 42 | 5200 | 0.32 | 0.9442 | 111 | 31 |
| 8 | " | 7.0 | 215 | (102) | 38 | 5000 | 0.41 | 0.9430 | 106 | 31 |
| 9 | Azeotrope-Dried | 5.0 | 200 | (93) | 40 | 5200 | 0.26 | 0.9444 | 93 | X |

TABLE I-continued

| Run | Catalyst | % Hexene Comonomer | Reaction Temp., °F (°C) | Run Time, Min. | Prod. lb/lb | MI | Density | HLMI/MI | ESCR $F_{50}$, Hrs. |
|---|---|---|---|---|---|---|---|---|---|
| | Cogel | | | | | | | | |

X - not run but based on other runs it would be as high or slightly higher than comparable spray dried cogel.

Figure 2:
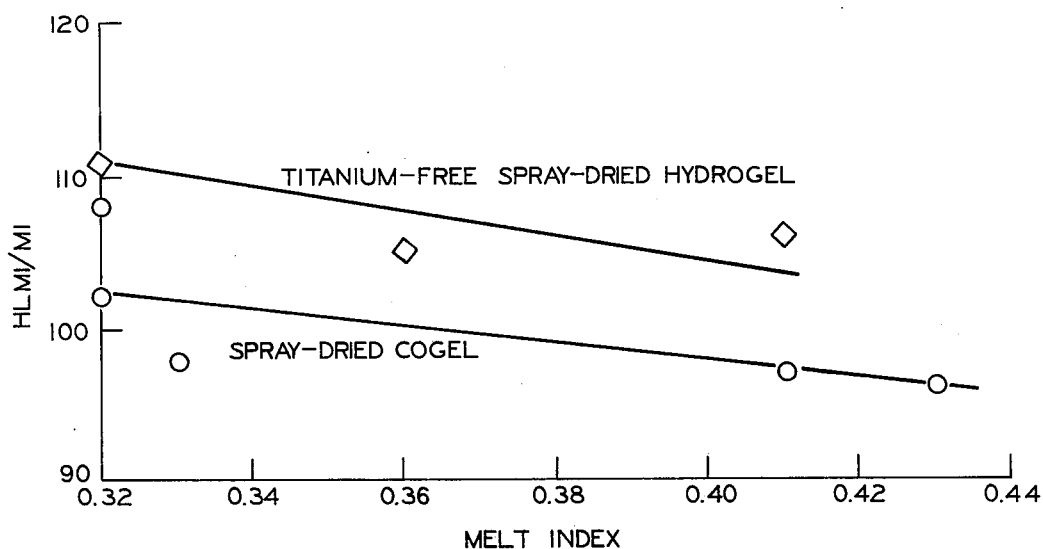
FIG. 2 is a plot of the molecular weight distribution as evidenced by HLMI/MI ratio vs. melt index for polymer produced using spray dried titanium-containing cogel of the invention and for comparison, spray dried titanium-free silica.

The data in Table I show that the environmental stress crack resistance of the copolymers made with the spray-dried cogel was much superior to the resistance of copolymers made with the titanium-free spray dried catalyst. This is more clearly shown in FIG. 1. This cannot be accounted for by breadth in molecular weight distribution (MWD). In fact as shown in FIG. 2, the polymers made with the titanium-free spray dreid hydrogel were higher in HLMI/MI ratio and thus presumably slightly broader in MWD. Broadening of the MWD generally causes an increase in ESCR.

Figure 3:
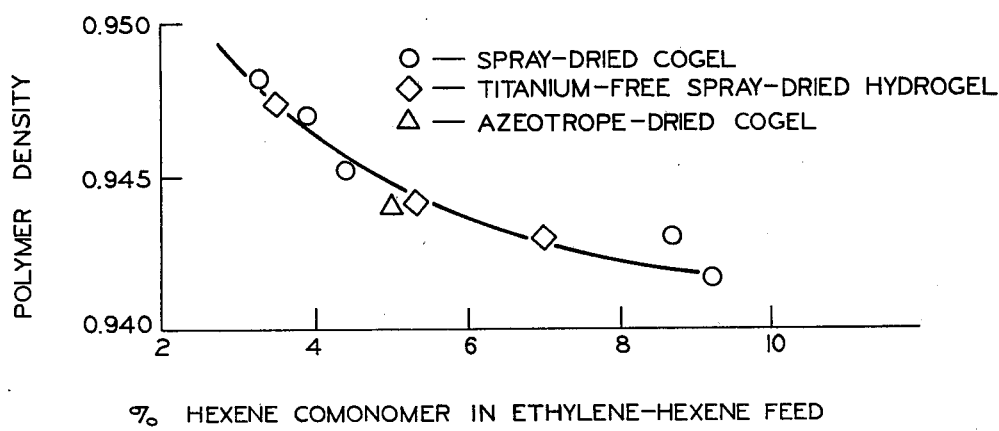
FIG. 3 is a plot of density vs. comonomer content for polymer produced using spray dried titanium-containing cogel of the invention, and for comparison spray dried titanium-free cogel and azeotrope dried cogel.

The activity of the spray dry cogel catalyst was greater than that of the titanium-free spray dried hydrogel as shown by the shorter run times required to reach 5000 or greater productivity. No significant difference in incorporation of 1-hexene between the two catalysts or the azeotrope dried cogel was apparent as shown in FIG. 3.

Figure 4:
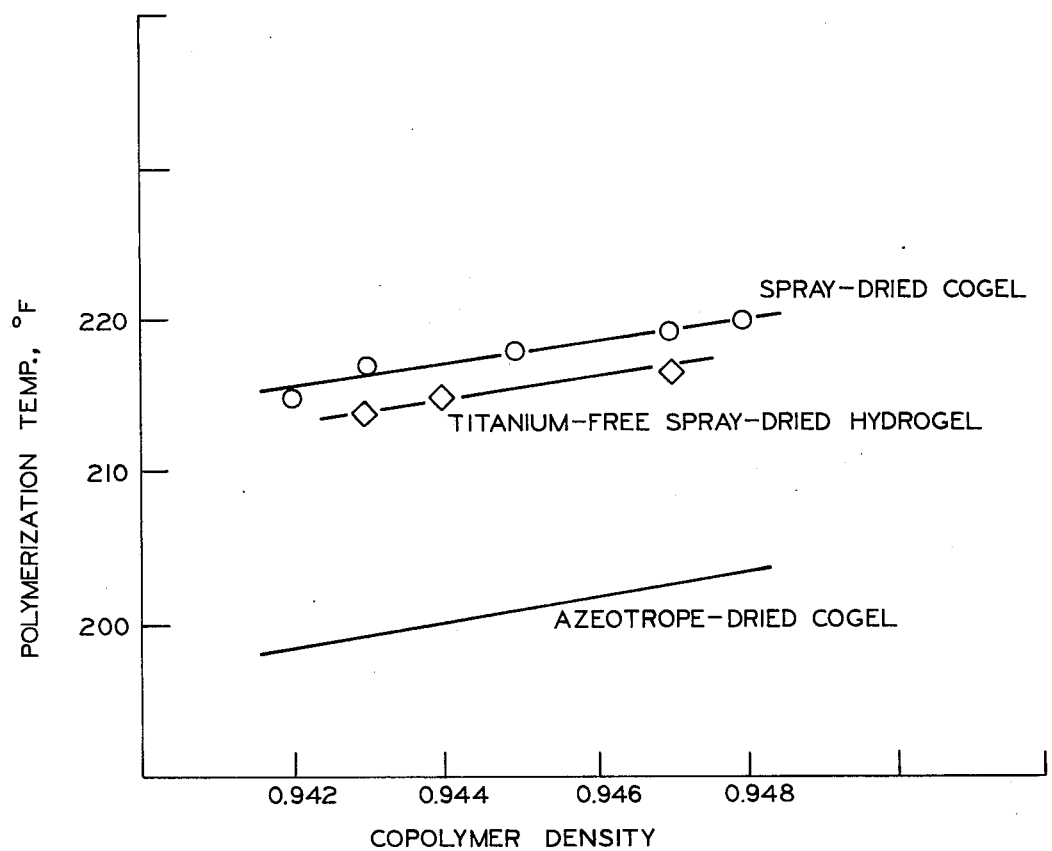
FIG. 4 is a plot of the copolymer density vs. the polymerization temperature required to give a 0.3 melt index of polymer for polymer produced using the spray dried cogel of this invention and for comparison spray dried titanium-free silica and azeotrope dried cogel.

Reaction temperature required to produce polymer of a given melt index and density was 2°-3° F (1°-2° C) higher using the spray dried cogel of the invention than for the spray dried titanium-free silica, and about 20° F (11° C) higher than for the azeotrope dried cogel, as shown in FIG. 4. This is an advantage from a production standpoint since chances of reactor fouling are decreased at higher temperatures.

Thus it can be seen that instead of compromising one property to obtain an improvement in another, the catalyst of te invention unexpectedly can allow higher reaction temperature and at the same time give higher environmental stress crack resistance.

EXAMPLE II

Catalysts similar to the spray dried cogel of Example I were prepared wherein aqueous $CrO_3$ was utilized to impregnate the hydrogel before spray drying. Essentially the same unexpected improvement in the resulting environmental stress crack resistance was obtained with essentially the same ability to utilize the high reaction temperature.

EXAMPLE III

Another spray dried cogel was prepared wherein chromium acetate was incorporated with the acid and coprecipitated with the titanium and silica. As in Examples I and II, this catalyst was used to produce ethylene/1-hexene copolymer with essentially the same unexpected improvement in environmental stress crack resistance and essentially the same ability to utilize the higher reaction temperature.

While this invention has been described in detail for the purpose of illustration, it is not to be construed as limited thereby, but is intended to cover all changes and modifications within the spirit and scope thereof.

We claim:

1. A catalyst produced by a process comprising forming a hydrogel by contacting an alkali metal silicate with a material selected from the group consisting of acids, acidic salts, and carbon dioxide, said hydrogel having coprecipitated therewith a titanium compound; spray drying said thus-formed hydrogel to form a xerogel; thereafter calcining said xerogel to form said catalyst, said catalyst containing in addition 0.1 to 20 wt. % chromium calculated as $CrO_3$ based on the total weight of said catalyst.

2. The catalyst according to claim 1 wherein said hydrogel is formed by adding sodium silicate to sulfuric acid, which sulfuric acid contains a titanium compound.

3. A catalyst according to claim 2 wherein said titanium compound is titanyl sulfate.

4. A catalyst according to claim 1 wherein said chromium is incorporated by impregnating said hydrogel with an aqueous solution of a chromium compound.

5. A catalyst according to claim 1 wherein said chromium is incorporated by impregnating said xerogel with a solution of a chromium compound.

6. A catalyst according to claim 1 wherein said chromium is incorporated by including a chromium compound in said acid so as to form a tergel hydrogel.

7. A catalyst according to claim 1 wherein said hydrogel is produced by adding sodium slicate to sulfuric acid which sulfuric acid contains titanyl sulfate, aging said thus formed hydrogel at an elevated temperature and washing to remove sodium ions; said chromium is incorporated by impregnating said xerogel with an aqueous solution of $CrO_3$; and said calcining is carried out at a temperature within the range of 900°-1700° F.

* * * * *